(12) United States Patent
Aoyama

(10) Patent No.: US 7,564,224 B2
(45) Date of Patent: Jul. 21, 2009

(54) POWER-GENERATOR CONTROL METHOD AND APPARATUS USING EXTERNALLY APPLIED PERIODIC SIGNAL

(75) Inventor: Toru Aoyama, Okazaki (JP)

(73) Assignee: Denso Corporation, Kariya (JP)

( * ) Notice: Subject to any disclaimer, the term of this patent is extended or adjusted under 35 U.S.C. 154(b) by 331 days.

(21) Appl. No.: 11/593,483

(22) Filed: Nov. 7, 2006

(65) Prior Publication Data

US 2007/0210763 A1   Sep. 13, 2007

(30) Foreign Application Priority Data

Nov. 8, 2005   (JP) ............... 2005-323009

(51) Int. Cl.
*H02H 11/00* (2006.01)
(52) U.S. Cl. ............... 322/28; 322/27; 322/33; 322/37
(58) Field of Classification Search ........... 322/28, 322/27, 37, 33
See application file for complete search history.

(56) References Cited

U.S. PATENT DOCUMENTS 6,621,251 B2   9/2003   Ogino et al.
7,368,893 B2 *   5/2008   Tsuzuki .............. 322/28
7,443,142 B2 *   10/2008   O'Gorman et al. ...... 322/24

FOREIGN PATENT DOCUMENTS

| JP | 55-139035 A | 10/1980 |
|---|---|---|
| JP | 06-276796 A | 9/1994 |
| JP | 06-284598 A | 10/1994 |
| JP | 2002-125398 A | 4/2002 |

\* cited by examiner

*Primary Examiner*—Nicholas Ponomarenko
*Assistant Examiner*—Iraj A Mohandesi
(74) *Attorney, Agent, or Firm*—Oliff & Berridge, PLC

(57) ABSTRACT

In a power-generator control apparatus installed in a power-generator designed to generate an output voltage at an output terminal thereof, a regulating unit regulates the output voltage so that the regulated output voltage is equivalent to a first target value. When a periodic signal with a predetermined frequency is applied from the outside of the power-generator to the output terminal thereof to be superimposed on the output voltage, a regulated voltage changing unit operatively connected to the regulating unit receives the periodic signal, and compares the frequency of the received periodic signal with a predetermined threshold frequency. The regulated voltage changing unit changes the first target value of the regulated output voltage to a second target value upon the frequency of the received periodic signal being higher than the predetermined threshold frequency.

14 Claims, 4 Drawing Sheets

POWER-GENERATOR CONTROL METHOD AND APPARATUS USING EXTERNALLY APPLIED PERIODIC SIGNAL

CROSS REFERENCE TO RELATED APPLICATION

This application is based on Japanese Patent Application No. 2005-323009 filed on Nov. 8, 2005. The descriptions of the Patent Application are all incorporated herein by reference.

BACKGROUND OF THE INVENTION

1. Field of the Invention

The present invention relates to methods and apparatuses for controlling a regulated voltage of a power-generator based on a periodic signal supplied from the outside of the power generator.

2. Description of the Related Art

Japanese Unexamined Patent Publications No, H06-276796, H06-284598, and 2002-125398 disclose one type of conventional alternators for vehicles; this type of conventional alternators has an output terminal (B terminal) located outside of the alternator casing, a ground terminal directly connected to the alternator casing, and no IG (ignition) terminals located outside of the alternator casing.

Normal alternators have a characteristic in which rotation of a rotor allows a microvoltage to be created in stator windings surrounding the rotor without the need of flow of a field current into a field winding of the rotor. Specifically, because magnetizing force remaining in the core of the rotor provides field poles therein, the rotation of the filed poles in the rotor creates magnetic fluxes so that the created magnetic fluxes induce a microvoltage in the stator windings.

A conventional alternator of this type is designed to detect the microwave induced in the stator windings, to trigger a power source circuit based on the detected microvoltage, and to turn a switch element on and off based on an operating voltage supplied from the power source circuit. The on and off control of the switch element allows an output voltage of the alternator to be regulated.

Fuel efficiency of vehicle has been improved to have low environmental impact. For example, an alternator installed in a vehicle, an input terminal mounted on the alternator housing is used to input a command signal into a control unit installed in the alternator. Based on the command signal, the control unit is operative to:

reduce a regulated voltage to reduce the output power of the alternator while the vehicle is being accelerated; and increase the regulated voltage to store regenerative electric power in a battery.

In the type of conventional alternators disclosed in the Patent Publications, for input of the command signal output from an external control unit to the alternator control unit installed in the alternator, because no IG terminal is are located outside of the alternator casing, it is necessary to:

form an opening in the alternator casing;

additionally mount an input terminal through the opening using, for example, a connector; and establish electrical connection between the alternator control unit and the external control unit through the input terminal.

The type of the alternator 1 however may increase the cost of the alternator because of many structural changes in the alternator and addition of parts including the connector.

Especially, let us consider that a connector connecting the input terminal is mounted in the opening formed through the rear cover of the alternator casing.

In the configuration, however, foreign particles, such as pieces of metal, particles of soil, water particles, oil particles, and the like, may enter into the alternator through the opening. This may cause the environmental resistance of the alternator to deteriorate.

Then, in order to improve the environmental resistance of the alternator to thereby ensure the reliability of the alternator of the configuration, it is necessary to provide a specific structure to the rear cover to prevent foreign particles from entering into the alternator through the opening for the input terminal. In addition, it is necessary to secure waterproof of part of the connector in which the input terminal is fitted.

As described above, mounting of the input terminal through the rear cover of an alternator using a connector may further increase the cost of the alternator.

SUMMARY OF THE INVENTION

In view of the background, an object of at least one aspect of the present invention is to provide method and apparatuses for controlling a regulated output voltage of a power-generator based on an externally applied periodic signal without using an input terminal for input of the periodic signal into the power-generator.

According to one aspect of the present invention, there is provided a power-generator control apparatus installed in a power-generator designed to generate an output voltage at an output terminal thereof. The power-generator control apparatus includes a regulating unit configured to regulate the output voltage so that the regulated output voltage is substantial equivalent to a first target value. The power-generator control apparatus includes a regulated voltage changing unit operatively connected to the regulating unit. The regulated voltage changing unit is configured to, when a periodic signal with a predetermined frequency is applied from the outside of the power-generator to the output terminal thereof to be superimposed on the output voltage, receive the periodic signal. The regulated voltage changing unit is configured to compare the frequency of the received periodic signal with a predetermined threshold frequency, and to change the first target value of the regulated output voltage to a second target value upon the frequency of the received periodic signal being higher than the predetermined threshold frequency.

According to another aspect of the present invention, there is provided a power-generator control system in which a power-generator is designed to generate an output voltage at an output terminal thereof. The power generator control system includes a regulating unit configured to regulate the output voltage so that the regulated output voltage is substantially equivalent to a first target value. The power-generator control system includes a signal applying unit located outside of the power-generator and configured to apply a periodic signal with a predetermined frequency to the output terminal to be superimposed on the output voltage. The power-generator control system includes a discriminating unit configured to receive the periodic signal superimposed on the output voltage and to discriminate whether the frequency of the received periodic signal is higher than a predetermined threshold frequency. The power-generator control system includes a regulated voltage changing unit operatively connected to the regulating unit and configured to change the first target value of the regulated output voltage to a second target value when it is discriminated that the frequency of the received periodic signal is higher than the threshold frequency.

According to a further aspect of the present invention, there is provided a method of controlling a power-generator designed to generate an output voltage at an output terminal thereof. The method includes regulating the output voltage so that the regulated output voltage is substantially equivalent to a first target value. The method also includes, when a periodic signal with a predetermined frequency is externally applied from the outside of the power-generator to the output terminal thereof to be superimposed on the output voltage, receiving the periodic signal. The method Per includes discriminating whether the frequency of the received periodic signal is higher than a predetermined threshold frequency. The method includes changing the first target value of the regulated output voltage to a second target value when it is discriminated that the frequency of the received periodic signal is higher than the predetermined threshold frequency.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Embodiments of the present invention will be described hereinafter with reference to the accompanying drawings.

First Embodiment

Figure 1:
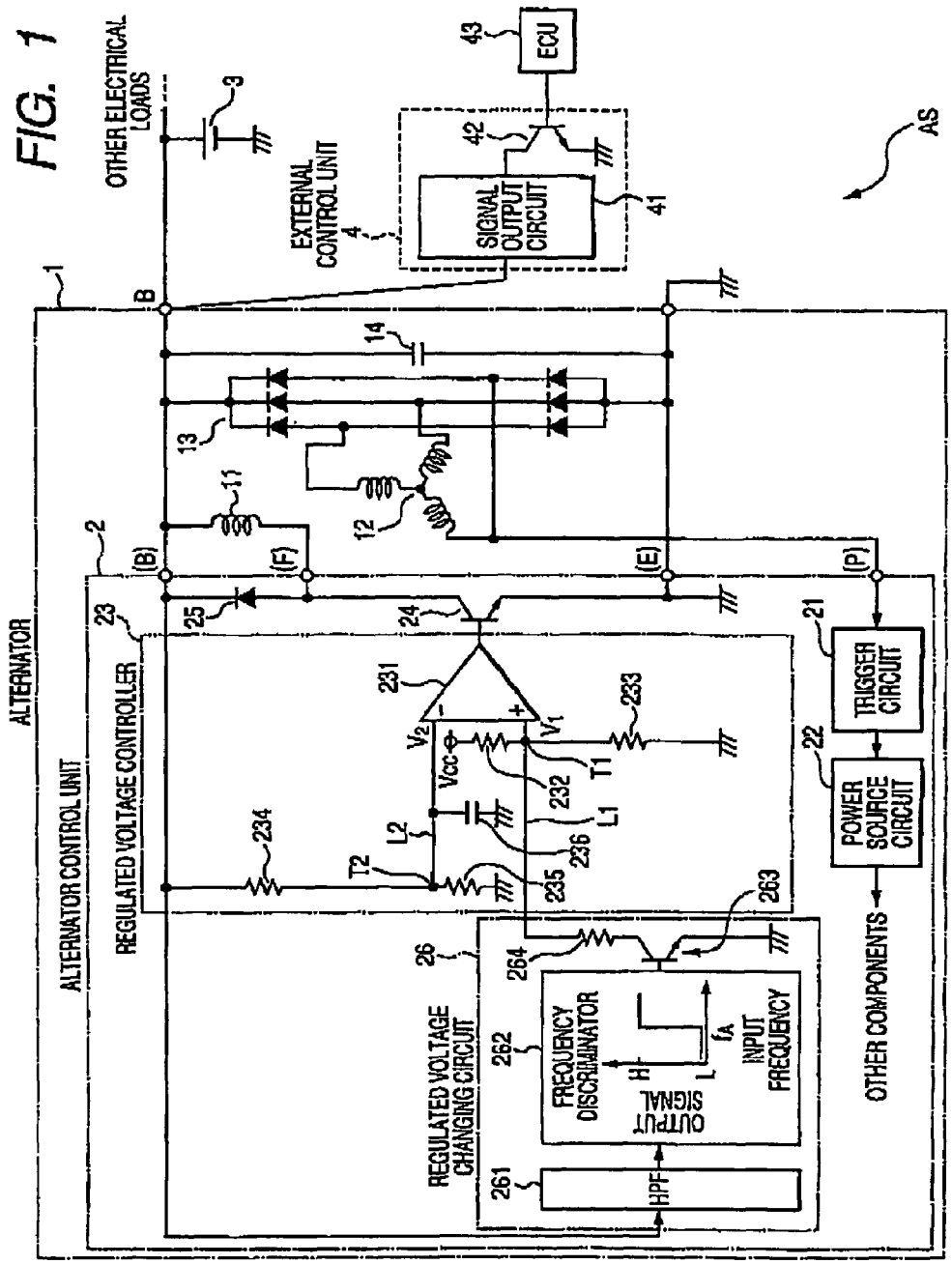
FIG. 1 is a circuit diagram schematically illustrating an example of the structure of an alternator and that of an external control unit according to a first embodiment of the present invention.

Referring to FIG. 1, there is provided an alternator 1 as an example of power-generators, and an alternator control unit 2 installed in the alternator 1. The alternator 1 has been installed in a vehicle. The alternator control unit 2 will be referred to simply as "control unit 2" hereinafter.

The alternator 1 has a terminal B to which a B terminal of the control unit 2, a positive terminal of a battery 3, and other electrical loads (not shown) are connected. The terminal B of the alternator 1 serves as an output terminal B of the alternator 1. In the first embodiment, the positive terminal voltage of the battery 3 is 12V when the battery 3 is fully charged.

The alternator 1 also has a ground terminal E serving as, for example, a signal common (signal ground) thereof. A terminal E of the control unit 2 is connected to the ground terminal E of the alternator 1.

The alternator 1 is equipped with a field winding (exciting winding) 11 wound around a core for field poles to constitute a rotor (not shown). The rotor is coupled to a crankshaft of an engine through a belt to be rotatable therewith.

The alternator 1 is provided with three-phase stator windings 12 connected in, for example, star configuration and wound around a stator core that surrounds the rotor, and a rectifier 13 consisting of, for example, three pairs of positive (high-side) and negative (low-side) diodes connected in the form of a bridge. Specifically, the positive and negative diodes of each pair are connected in series at a connection point, and the connection points of the three paired diodes are connected to lead wires of the three-phase stator windings 12, respectively.

The cathodes of the high-side diodes are commonly connected to the output terminal B of the alternator 1 via the terminal B of the control unit 2, and the anodes of the low-side diodes are commonly connected to the ground terminal E of the alternator 1. One end of the exciting winding 11 is connected to the cathodes of the high-side diodes, and the other end thereof is connected to an F terminal of the control unit 2.

The alternator 1 is also provided with a capacitor 14 connected between the output terminal B and the ground terminal E thereof.

In the alternator 1, when the field vending 11 is energized while the rotor rotates, the rotating field winding 11 creates magnetic fluxes. The created magnetic fluxes magnetizes the core to provide the field poles.

The rotation of the filed poles creates magnetic fluxes, and the created magnetic flues induce a three-phase AC voltage in the three-phase stator windings 12. The rectifier 13 full-wave rectifies the induced three-phase AC voltage induced in the stator windings 12 to a direct current (DC) voltage. The full-wave rectified DC voltage is output through the output tern B so that the output DC voltage is supplied to the battery 3 and the electrical loads.

The capacitor 14 is operative to reduce electrical noise contained in the output DC voltage.

The output voltage of the alternator 1 depends on the number of rotation of the rotor and the amount of the field current to be supplied to the field winding.

Thus, the control unit 2 is operative to control the field current to be supplied to the field winding 11.

Specifically, the control unit 2 includes a trigger circuit 21, a power source circuit 22, a regulated-voltage controller 23, a switch element 24, flywheel diode 25, and a regulated-voltage changing circuit 26.

The trigger circuit 21 is connected to a P terminal of the control unit 2. One phase winding of the three-phase stator windings 12 is connected to the P terminal. This allows one phase voltage of the three-phase stator windings 12 to be input to the trigger circuit 21.

For example, the trigger circuit 21 consists essential of a comparator, and is operative to compare the one phase voltage with a predetermined threshold voltage, and to output a trigger signal with a low level when the one phase voltage is greater than the threshold voltage.

Figure 2:
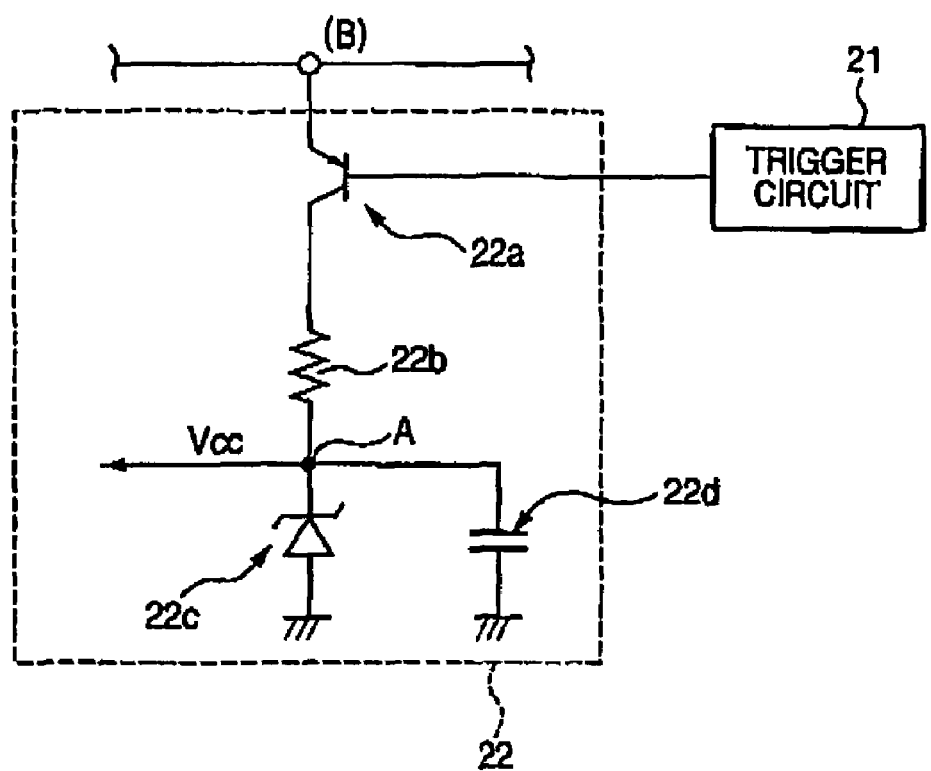
FIG. 2 is a circuit diagram schematically illustrating an example of the structure of a power source circuit of the alternator illustrated in FIG. 1.

As illustrated in FIG. 2, the power source circuit 22 includes a switch element 22a, such as a PNP transistor, a resistor 22b, a constant voltage circuit 22c, and a capacitor 22d. The resistor 22b and the capacitor 22d serve as a smoothing circuit The constant voltage circuit 22c consists essentially of a zener diode.

Specifically, the base of the switch element 22a is connected to an output terminal of the trigger circuit 21, and the emitter thereof is connected to the output terminal B of the alternator 1 through the B terminal of the alternator control unit 2. The collector of the switch element 22a is connected to one end of the resistor 22b.

The other end of the resistor 22b is connected at a tap A to one end of the zener diode 22c in series, and the other end of the zener diode 22c is grounded. The capacitor 22d is connected to the other end of the resistor 22b at the tap A in parallel to the zener diode 22c. The zener diode 22c has a predetermined breakdown voltage (zener voltage Vz).

In the structure of the power source circuit 22, when no tier signals with the low level are supplied from the trigger circuit 21 to the base of the switch element 22a, the switch element 22a is in off state so that no operating voltage is created by the power source circuit 22.

In contrast, when the trigger signal with the low level is supplied from the trigger circuit 21 to the base of the switch element 22a, the switch element 22a becomes on. The on-state of the switch element 22a allows the voltage at the output terminal B of the alternator 1 to be applied across the zener diode 22c through the resistor 22b. It is to be noted that the voltage at the output terminal B of the alternator 1, which is equivalent to a potential at the positive terminal of the battery 3 when no output power is generated by the alternator 1.

The voltage at the output terminal B of the alternator 1 applied across the zener diode 22c through the resistor 22b permits the voltage at the tap A to be set to a substantially constant voltage based on the zener voltage Vz and the voltage drop across the switch element 22a. The smoothing circuit of the resistor 22b and the capacitor 22d is operative to remove ripples from the voltage at the output terminal B.

The power source circuit 22 is configured to supply the substantially constant voltage as an operating voltage Vcc to the other components of the control unit 2.

The regulated voltage controller 23 is connected to the regulated voltage changing circuit 26 and the output terminal B of the alternator 1 via the B terminal of the control unit 2. The regulated voltage controller 23 is operative to create a control signal for controlling on and off operations of the switch element 24.

The switch element 24 consists essentially of a power transistor, such as an NPN transistor.

Specifically, the base of the switch element 24 is connected to an output terminal of the regulated voltage controller 23, and the collector thereof is connected to the output terminal B of the alternator 1 through the flywheel diode 25. The emitter of the switch element 24 is connected to the E terminal of the control unit 2 (the ground terminal E of the alternator 1) to be grounded. The collector of the switch element 24 is also connected to the other end of the field winding 11.

The flywheel diode 25 is connected at its cathode to the output terminal 3 of the alternator 1 via the B terminal of the control unit 2 and at its anode to the collector of the switch element 24 to be parallel to the field current 11.

Specifically, when the switch element 24 becomes on, a field current flows through the filed winding 11 based on the voltage at the output terminal B of the alternator 1. In contrast, when the switch element 24 becomes off, the field current continues to flow through the flywheel diode 25.

The regulated voltage controller 23 is composed of a comparator 231, a first resistor 232 with a resistance r1, a second resistor 233 with a resistance r2, a third resistor 234 with a resistance r3, a fourth resistor 235 with a resistance r4, and a capacitor 236.

The comparator 231 has a positive input terminal (+) and a negative input terminal (−). The positive input terminal of the comparator 231 is connected to the regulated voltage changing circuit 26 via a line L1, and the negative input terminal thereof is connected to the output terminal B of the alternator 1 via the B term of the control unit 2 and a line L2. The third resistor 234 is placed in the line L2.

One end of the first resistor 232 is connected at a tap T1 of the line L1, and the other end thereof is connected to an output terminal of the power source circuit 22. One end of the second resistor 233 is connected to the tap T1 of the line L1, and the other end thereof is grounded so that the first and second resistors 232 and 233 are arranged in series through the tap.

The chain of the series-connected first and second resistors 232 and 233 allows the operating voltage Vcc to be divided depending on the ratio of the first and second resistors 232 and 233 to thereby generate, at the tap T1, a reference voltage V1 that is substantially equivalent to a predetermined first regulated voltage (first target value) of, for example, 14 V. The reference voltage of 14 V is suitable for charging the battery 3 in normal state whose charging voltage is 12 V.

The generated reference voltage V1 is applied to the positive input terminal of the comparator 231. The reference voltage V1 is expressed by the following equation:

$$V1 = \frac{r2 \cdot V_{cc}}{r1 + r2}$$

Moreover, one end of the third resistor 234 is connected at a tap T2 of the line 12, and the other end thereof is connected to the output terminal B of the alternator 1 via the B terminal of the control unit 2. One end of the fourth resistor 235 is connected to the tap T2 of the line L2, and the other end thereof is grounded so that the third and fourth resistors 234 and 235 are arranged in series through the tap T2.

The chain of the series-connected third and fourth resistors 234 and 235 allows a voltage at the output terminal B of the alternator 1 to be divided depending on the ratio of the third and fourth resistors 234 and 235 to thereby generate, at the tap 12, a monitor voltage V2 for monitoring the voltage at the output terminal B of the alternator 1. This allows the monitor voltage V2 to be applied to the negative input terminal of the comparator 231.

The monitor voltage V2 is expressed by the following equation:

$$V2 = \frac{r4 \cdot V_B}{r3 + r4}$$

Where $V_B$ represents the voltage at the output terminal B of the alternator 1.

One end of the capacitor 236 is connected to the line L2, and the other end is grounded. The capacitor 236 is operative to eliminate noise contained in the voltage at the output terminal B of the alternator 1 to thereby stabilize the on/off control of the switch element 24.

The regulated voltage changing circuit 26 includes a high-pass filter (HPF) 261, a frequency discriminator 262, a switch element 263, and a fifth resistor 264 with a resistance r5.

For example, as the high-pass filter 261, a CR filter consisting essential of a capacitor and a resistor is used. The high-pass filter 261 is connected to the frequency discriminator 262 and the output terminal B of the alternator 1 via the B terminal of the control unit 2.

The high-pass filter 261 is operative to permit signals superimposed on the voltage at the output terminal B each with frequencies higher than a predetermined cut-off frequency to pass therethrough.

The frequency discriminator 262 is operative to compare the frequency of an input signal passing through the high-pass filter 261 with a predetermined threshold frequency $f_A$ of, for example, 1 MHz.

If it is discriminated that the frequency of the input signal is lower than the threshold frequency $f_A$, the frequency discriminator 262 is operative to output a signal with a low level.

Otherwise if it is determined that the frequency of the input signal is higher than the threshold frequency $f_A$, the frequency discriminator 262 is operative to output a signal with a high level.

The switch element 263 consists essentially of a transistor, such as an NPN transistor.

Specifically, the base of the switch element 263 is connected to an output terminal of the frequency discriminator 262, and the collector thereof is connected to the positive input terminal of the comparator 231 through the fifth resistor 264. The emitter of the switch element 263 is grounded.

In addition, as illustrated in FIG. 1, the alternator 1 is electrically connected at its output terminal B to an external control unit 4 located outside of the alternator 1.

In the it embodiment, the alternator 1 and the external control unit 4 constitute an alternator control system AS.

Specifically, the external control unit 4 includes a signal output circuit 41 and a switch element 42.

The switch element 42 consists essentially of a transistor, such as an NPN transistor.

Specifically, the base of the switch element 42 is connected to an ECU 43, such as an engine ECU installed in the vehicle.

The collector of the switch element 42 is connected to an input terminal of the signal output circuit 41. The emitter of the switch element 42 is grounded.

The ECU 43 is operative to determine whether the vehicle is accelerated or decelerated based on at least one measured and sent from at least one sensor installed in the vehicle and connected thereto.

An output terminal of the signal output circuit 41 is connected to the output terminal B of the alternator 1.

In the first embodiment, when the vehicle is being accelerated, the ECU 43 works to supply, to the base of the switch element 42, a control signal representing that the vehicle is being accelerated.

The control signal input to the base of the switch element 42 permits the switch element 42 to become on. In response to the turning on of the switch element 42, the signal output circuit 41 works to output, to the output terminal B of the alternator 1, a command signal CS with a predetermined high frequency $f_H$ on the order of several megahertz or higher. The output command signal CS is superimposed on the voltage at the output terminal B of the alternator 1. In the first embodiment, the frequency $f_H$ is set to be higher than the cut-off frequency of the high-pass filter 261.

When the ECU 43 halts the supply of the control signal to the base of the switch element 42, the switch element 42 becomes off. This prevents the signal output circuit 41 from outputting the command signal CS to the output terminal B of the alternator 1.

Operations of the alternator 1 will be described hereinafter.

When the engine rotates with rotation of the rotor, because magnetizing force remains in the core of the filed rotor to provide the field poles, the rotation of the filed poles creates magnetic fluxes so that the created magnetic fluxes induce a three-phase microvoltage in the three-phase stator windings 12 without flow of a filed current through the field winding 11.

One-phase voltage in the three-phase microvoltage is input to the trigger circuit 21.

In the first embodiment, the magnitude of the one phase voltage is set to be greater than that of the threshold voltage of the trigger circuit 21.

For this reason, the trigger circuit 21 determines that the one phase voltage is greater than the threshold voltage level, so that the trigger circuit 21 outputs the trigger signal with the low level to the power source circuit 22.

As described above, in response to the trigger signal, the power source circuit 22 outputs, as the operating voltage Vcc, the substantially constant voltage based on the zener voltage Vz and the voltage drop across the switch element 22a.

Because the operating voltage Vcc is applied to the series-connected first and second resistors 232 and 233, the operating voltage Vcc is divided depending on the ratio of the first and second resistors 232 and 233 so that the reference voltage V1 is generated to be applied to the positive input terminal of the comparator 231.

On the other hand, the voltage (potential) at the output terminal B, which is substantially equivalent to 12 V when no output power is generated by the alternator 1, is applied to the series-connected third and fourth resistors 234 and 235. For this reason, the voltage at the output terminal B of the alternator 1 is divided depending on the ratio of the third and forth resistors 234 and 235 so that the monitor voltage V2 lower in level than the reference voltage V1 is generated to be applied to the negative input terminal of the comparator 231.

Thus, since the reference voltage V1 is greater than the monitor voltage V2, the comparator 231 outputs a switching signal with a high level, and the high-level switching signal turns the switch element 24 on.

This allows a field current to flow through the field winding 11 of the rotor based on the voltage at the output terminal B of the alternator 1. The filed current flowing through the field winding 11 of the rotor that is rotating creates magnetic fluxes so that the magnetizing force in the core is increased. This allows the magnitude of the three-phase voltage induced in the thee-phase stator windings 12 to increase.

The increase in the three-phase voltage induced in the three-phase stator windings 12 allows the output voltage of the alternator 1 at the output terminal B to increase, so that the monitor voltage V2 depending on the voltage at the output terminal B of the alternator 1 increases.

As a result, when the monitor voltage V2 approximately reaches the reference voltage V1 substantially equivalent to the predetermined first regulated voltage, the output of the comparator 231 is turned from the high level to a low level. This causes the switch element 24 to become off, so that the field current decreases.

The decrease in the field current reduces the voltage at the output terminal B of the alternator 1, so that the monitor voltage V2 depending on the voltage at the output terminal B of the alternator 1 decreases. This causes the output of the comparator 231 to be returned to the high level, allowing the switch element 24 to be turned on. The on state of the switch element 24 increases the filed current flowing through the filed winding 11.

The increase in the field current increases the voltage at the output terminal B of the alternator 1, so that the monitor voltage V2 depending on the voltage at the output terminal B of the alternator 1 increases.

These field-current control operations based on the on/off control of the switch element 24 allow the output terminal B of the alternator 1 to be regulated to the predetermined first regulated voltage of 14 V. The first regulated voltage at the output terminal B of the alternator 1 is supplied to the battery 3 and the other electrical loads.

Next, operations of the alternator control system AS for changing the regulated voltage based on the command signal CS supplied from the external control unit 4.

While the switch element 42 of the external control unit 4 is in on state based on control of the ECU 43, the sisal output circuit 41 outputs the command signal CS to the output terminal B of the alternator 1 to be superimposed on the voltage at the output terminal B. In the first embodiment, as the command signal CS, an oscillating signal with the high frequency $f_H$ of 5 MHz and with a peak-to-peak amplitude of 200 mV is used.

The frequency $f_H$ of the command signal CS is set to be higher than frequencies of switching noises superimposed on the voltage at the output terminal B of the alternator 1 when the switch element 24 is turned on and off in an exciting circuit. The exciting circuit is composed of the field winding 11, the flywheel diode 25 parallely connected thereto, and the switch element 24.

The frequency $f_H$ of the command signal CS is set to be higher than frequencies of commutation noises in synchronization with the number of revolutions of the rotor (alternator 1); these commutation noises are caused during the rectifying operations of the rectifier 13.

The reason why the frequency $f_H$ of the command signal CS is limited set forth above is as follows:

Specifically, the capacitor 14 connected between the output terminal B of the alternator 1 and the ground terminal E allows electrically oscillating noises consisting of the switching noises and the commutation noises to be attenuated with time. For example, the oscillating noises have an attenuation characteristic with time while oscillating within a frequency range between several tens kHz and several hundred kHz.

Thus, if the frequency $f_H$ of the command signal CS is set to be lower than the frequencies of the oscillating noises, the regulated voltage changing circuit 26 may mistake the oscillating noises as the command signal CS.

That is, setting of the frequency $f_H$ of the command signal CS to be higher than the frequencies of the oscillating noises can prevent the regulated voltage changing circuit 26 from mistaking the oscillating noises as the command signal CS.

The high-frequency command signal CS superimposed on the output terminal B of the alternator 1 is transferred through a voltage line connecting between the output terminal B of the alternator 1 and the B terminal of the alternator control unit 2 to be input to the regulated voltage changing circuit 26.

In the first embodiment, the cut-off frequency of the high-pass filter 261 is set to be close to and lower than the frequency $f_H$ of the command signal CS.

For this reason, the high-pass filter 261 allows the command signal CS to accurately pass therethrough, and thereafter, the command signal CS is input to the frequency discriminator 262.

In the frequency discriminator 262, the frequency $f_H$ of the command signal CS is compared with the threshold frequency $f_A$ of 1 MHz It is to be noted that the threshold frequency $f_A$ is set be higher than the frequencies of the oscillating noises.

Because the frequency $f_H$ (5 MHz) of the command signal CS is higher than the threshold frequency $f_A$ (1 MHz), the high-level signal is output from the frequency discriminator 262 to the switch element 263. The high-level signal allows the switch element 263 to be turned on.

In contrast, if the oscillating noises, such as the switching noises and/or the commutation noises, with frequencies within a band between several tens kHz and several hundred kHz, are input to the frequency discriminator 262, the threshold frequency $f_A$ (1 MHz) is higher than the frequencies of the input oscillating noises. For this reason, the low-level signal is output from the discriminator 262 to the switch element 263. The low-level signal allows the off state of the switch element 263 to be kept unchanged.

The on state of the switch element 263 allows the second resistor 233 and the fifth resistor 264 to be connected in parallel to each other. As a result, the first resistor 232 is connected in series to the parallely connected second and fifth resistors 233 and 264.

This allows the operating voltage Vcc to be divided depending on the ratio of the first resistor 232 and the pair of the parallely connected second and fifth resistors 233 and 264 to thereby generate, at the tap T1, a changed reference voltage V1$a$ whose level is smaller than the level of the reference voltage V1. Specifically, the changed reference voltage V1$a$ is expressed by the following equation:

$$V1a = \frac{\left(\frac{r2 \cdot r5}{r2+r5}\right) \cdot V_{cc}}{r1 + \left(\frac{r2 \cdot r5}{r2+r5}\right)} < V1$$

The changed reference voltage V1$a$ is set to be, for example, 12.5 V. The changed reference voltage V1$a$ is applied to the positive terminal of the comparator 231.

According, as described above, the field-current control operations based on the on/off control of the switch element 24 allow the voltage at the output terminal B of the alternator 1 to be regulated to a second regulated voltage (second target value) of, for example, 12.5 V lower in level than the first regulated voltage.

On the other hand, when the switch element 42 of the external control unit 4 is turned from the on state to the off state based on control of the ECU 43, the signal output circuit 41 halts the output of the command signal CS to the output terminal B of the alternator 1.

This halts the output of the high level signal from the frequency discriminator 262 to the switch element 263 so that the switch element 263 is turned off. This allows the reference voltage V1 to be input to the positive terminal of the comparator 231, and therefore, the monitor voltage V2 depending on the voltage at the output terminal B of the alternator 1 is regulated to be returned to the first regulated voltage of, for example, 14 V.

As described above, in the alternator control system AS, the external control unit 4 is configured to apply the high-frequency command signal CS to the output terminal 3 of the alternator 1 to be superimposed on the voltage at the output terminal B thereof.

The alternator control unit 2 is configured to compare the frequency $f_H$ of the high-frequency command signal CS with the predetermined threshold frequency $f_A$, and to reduce the level in the reference voltage based on the compared result. This allows the regulated voltage at the output terminal B of the alternator 1 to be reduced.

Accordingly, while the vehicle is being accelerated, it is possible to reduce the regulated voltage to suppress the output power of the alternator 1, thereby reducing the engine load of the vehicle.

That is, in the alternator 1 according to the first embodiment, use of the output terminal B of the alternator 1 allows the regulated voltage to be changed.

Accordingly, in the alternator 1, it is unnecessary to mount a new input terminal for input of the command signal CS to the alternator control unit 2 through the alternator casing, such as the rear cover. This can eliminate the need for:

additionally providing a connector and the like to mount the new input terminal through the alternator casing; and forming an opening to mount the new input terminal through the alternator casing.

For these reasons, structural additions and changes in the alternator 1 can be made redundant, making it possible to suppress the increase in the cost of the alternator 1. In addition, it is possible for the alternator 1 to additionally provide the regulated voltage changing function while keeping the environmental resistance of the alternator 1.

The regulated voltage changing circuit 26 is provided with the high-pass filter 261 that allows the command signal CS, whose frequency is higher than the cut-off frequency, superimposed on the voltage at the alternator output terminal B to only pass therethrough.

For this reason, it is possible for the frequency discriminator 262 to detect the high-frequency command signal CS independently of the magnitude of DC (Direct Current) component in the output voltage of the alternator 1.

Specifically, if the alternator output voltage is changed from its transient state to its steady state when the regulated voltage is changed, or if it is transiently changed when an electrical load connected to the alternator output terminal B is power on or interrupted, the command signal CS is superimposed on the alternator output voltage while following the change thereof.

Even if the alternator output voltage is changed as described above, because the cutoff frequency of the high-pass filter 261 is set to be close to and lower than the high frequency $f_H$ of the command signal CS, it is possible to accurately receive the command signal CS sent from the external control unit 4 independently of the change in the alternator output voltage.

Moreover, in the first embodiment, the frequency $f_H$ of the command signal CS is set to be higher than the predetermined threshold frequency $f_A$ used to change the regulated voltage by the frequency discriminator 262, and the predetermined threshold frequency $f_A$ is set to be higher than the frequency range of the oscillating noises caused by the alternator 1. This can prevent the frequency discriminator 262 from mistaking the oscillating noises as the command signal CS.

Second Embodiment

An alternator control system AS1 according to a second embodiment of the present invention will be described hereinafter. Identical reference characters are assigned to substantially identical components of the alternator control systems AS and AS1 according to the first and second embodiments.

Figure 3:
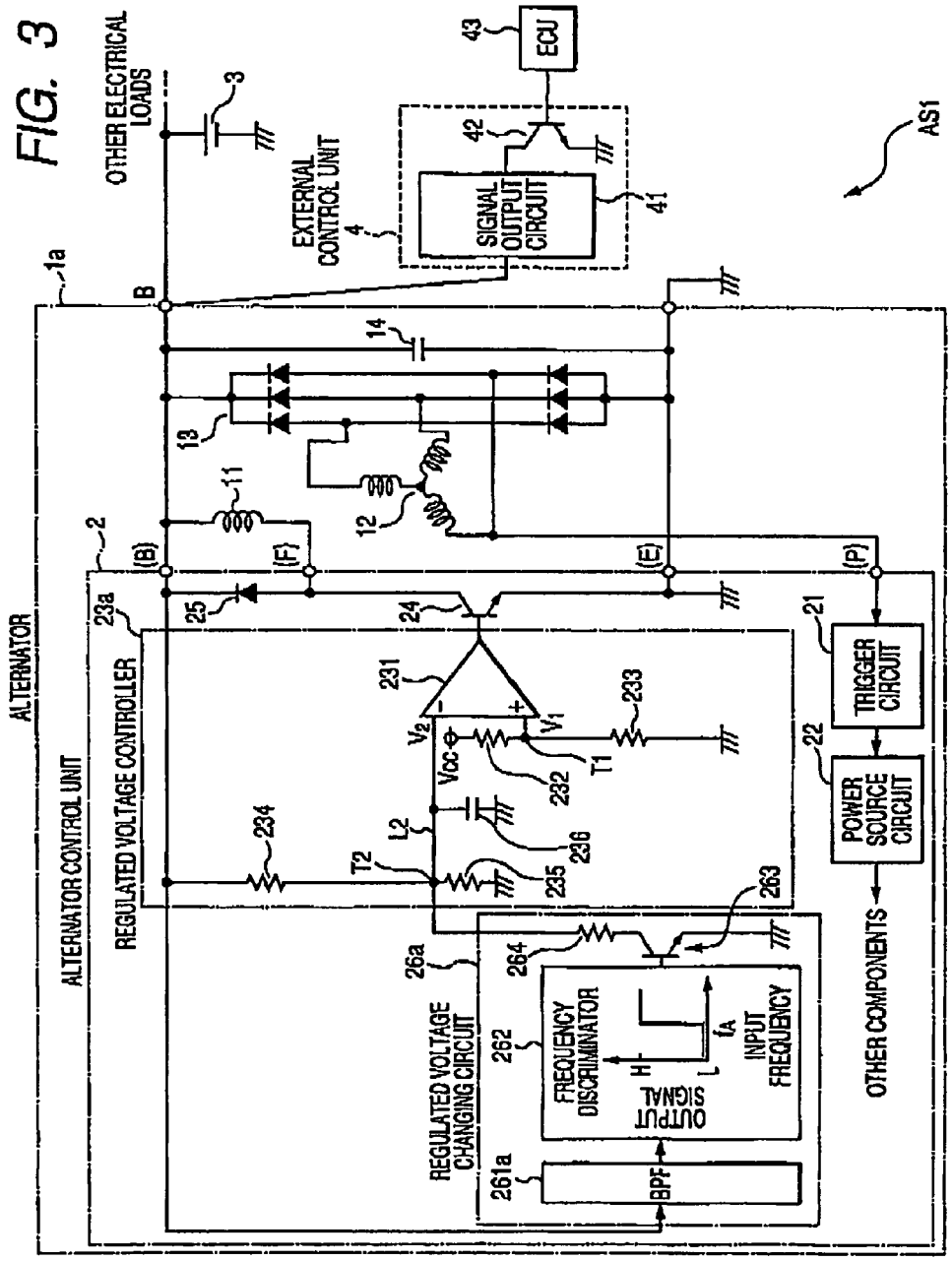
FIG. 3 is a circuit diagram schematically illustrating an example of the structure of an alternator and that of an e control unit according to a second embodiment of the present invention.

Referring to FIG. 3, there is provided the alternator control system AS1 including an alternator 1a and an external circuit 4.

In the alternator 1a, the structure of a regulated voltage controller 23a is different from that of the regulated voltage controller 23 illustrated in FIG. 1.

Specifically, in the regulated voltage controller 23a, in place of the positive input terminal of the comparator 231, the negative input terminal of the comparator 231 is connected to the collector of the switch element 263 through the line L2 and the fifth resistor 264.

In addition, a regulated voltage changing circuit 26a preferably has a band-pass filter (BPF) 261a in place of the high-pass filter 261.

The band-pass filter 261a is operative to permit signals superimposed on the voltage at the output terminal B each with frequencies ling between first and second cut-off frequencies to pass therethrough.

Like the first embodiment, the frequency $f_H$ of the command signal CS is set to be higher than the first cut-off frequency of the band-pass filter 261a, and lower than the second cut-off frequency thereof. Specifically, the first cut-off frequency of the band-pass filter 261a is set to be close to and lower than the frequency $f_H$ of the command signal CS, and the second cut-off frequency of the band-pass filter 261a is set to be close to and higher than the frequency $f_H$ of the command signal CS.

The structures of other components of the alternator 1a will be identical to those of corresponding components of the alternator 1.

Specifically, in the alternator control system AS1, when the vehicle is being decelerated, the ECU 43 works to supply, to the base of the switch element 42, a control signal representing that the vehicle is being decelerated. The control signal input to the base of the switch element 42 permits the switch element 42 to become on. In response to the turning on of the switch element 42, the command signal CS is output from the signal output circuit 41 to be superimposed on the voltage at the output terminal B of the alternator 1.

Like the alternator control system AS, the command signal CS is sent through the band-pass filter 261a to be input to the frequency discriminator 262. In the frequency discriminator 262, because the frequency $f_H$ (5 MHz) of the command signal CS is higher than the threshold frequency $f_A$ (1 MHz), the high-level signal is output from the frequency discriminator 262 to the switch element 263. The high-level signal allows the switch element 263 to be turned on.

The on state of the switch element 263 allows the fourth resistor 235 and the fifth resistor 264 to be connected in parallel to each other. As a result, the third resistor 234 is connected in series to the parallely connected fourth and fifth resistors 235 and 264.

This allows the voltage at the alternator output terminal B to be divided depending on the ratio of the third resistor 234 and the pair of the parallely connected fourth and fifth resistors 235 and 264. Therefore, a monitor voltage V2a whose level is smaller than the level of the monitor voltage V2 independently of change in the voltage at the alternator output terminal B is generated to be input to the negative input terminal of the comparator 231.

Specifically, the changed monitor voltage V2a is expressed by the following equation:

$$V2a = \frac{\left(\frac{r4 \cdot r5}{r4 + r5}\right) \cdot V_B}{r3 + \left(\frac{r4 \cdot r5}{r4 + r5}\right)} < V2$$

Where $V_B$ represents the voltage at the alternator output terminal.

For this reason, when the monitor voltage V2a approximately reaches the reference voltage V1 substantially equivalent to 14V, the regulated voltage at the alternator output terminal B according to the second embodiment is higher in level than the regulated voltage at the alternator output terminal B according to the first embodiment. In the second embodiment, the ted voltage at the alternator output terminal B can be set to a third target value of, for example, 16 V.

As described above, in the second embodiment, it is possible to increase the regulated voltage at the output terminal B of the alternator 1a as compared with the regulated voltage at the output terminal B of the alternator 1.

Thus, while the vehicle is being decelerated, it is possible to increase the regulated voltage at the alternator output terminal B, which allows regenerative electric power to be stored in the battery 3, thereby reducing the engine load of the vehicle.

In addition, in the second embodiment, the first cut-off frequency of the band-pass filter 261a is set to be close to and lower than the frequency $f_H$ of the command signal CS, and the second cut-off frequency of the band-pass filter 261a is set to be close to and higher than the frequency $f_H$ of the command signal CS.

For this reason, the band-pass filter 261a allows the command signal CS to accurately pass therethrough, and thereafter, the command signal CS is input to the frequency discriminator 262.

Especially, in recent years, high-frequency devices, such as EHF (Extremely High Frequency) devices have been installed in vehicles; these high-frequency devices are operative to transmit extremely high-frequency signals to detect obstacles around the vehicles, thereby improving the safety of the vehicles.

Accordingly, in view of the possibility of installation of the alternator control system AS1 according to the second embodiment in such a vehicle with the EHF device(s), the second cut-off frequency of the band-pass filter 261a can be preferably set to be close to and higher than the frequency $f_H$ of the command signal CS.

This allows high-frequency signals whose frequencies higher than the command signal CS to be effectively cut off by the band-pass filter 261a at the input stage of the regulated voltage changing circuit 26a, making it possible to prevent the regulated voltage changing circuit 26a from malfunctioning due to the high-frequency signals.

Third Embodiment

An alternator control system AS2 according to a third embodiment of the present invention will be described hereinafter. Identical reference characters are assigned to substantially identical components of the alternator control systems AS and AS2 according to the first and third embodiments.

Figure 4:
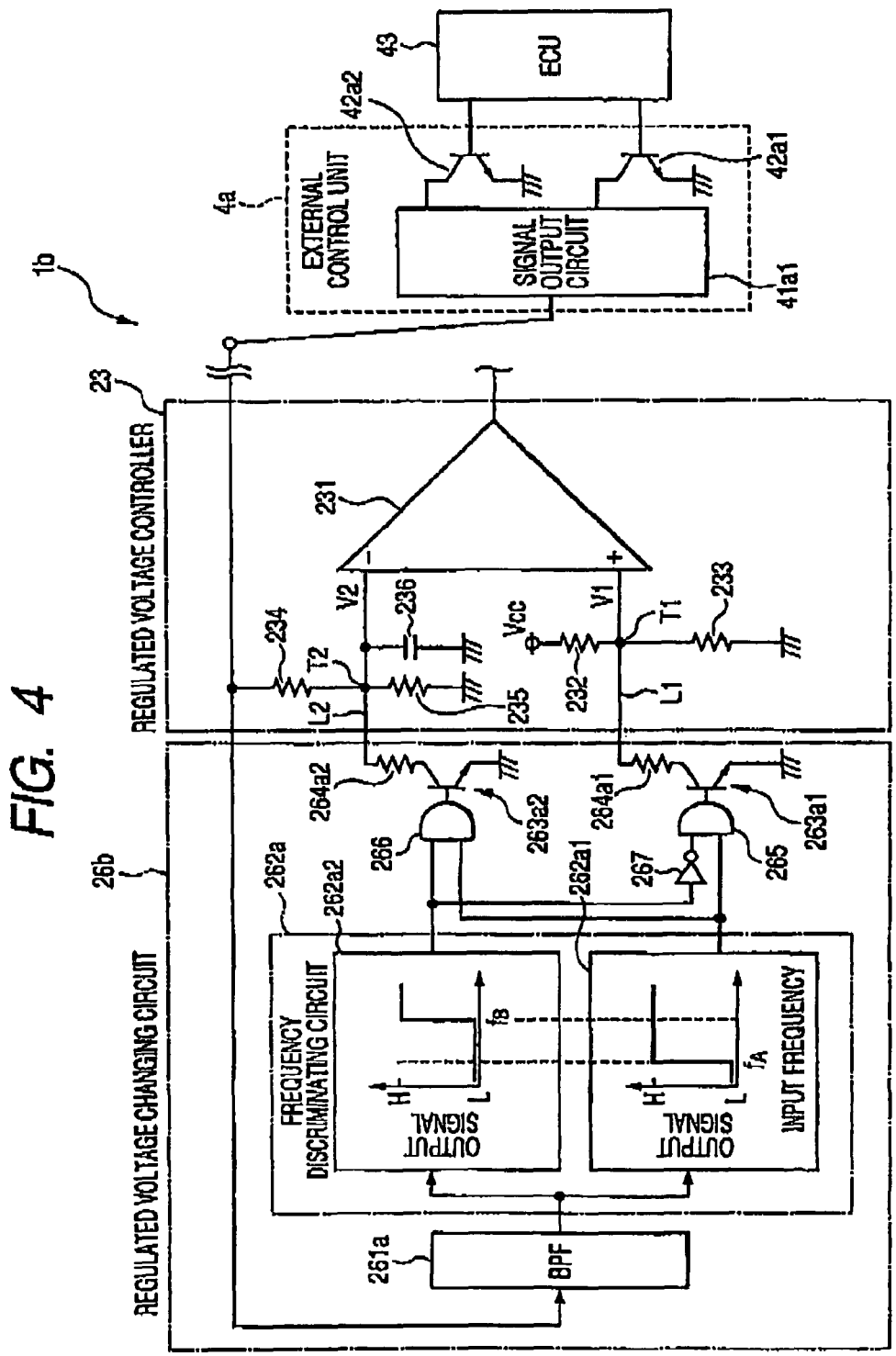
FIG. 4 is a circuit diagram schematically illustrating an example of the structure of part of an alternator according to a third embodiment of the present invention.

Referring to FIG. 4, there is provided the alternator control system AS2 including an alternator 1b and an external circuit 4a.

In the alternator 1b, the structure of a regulated voltage changing circuit 26b is different from that of the regulated voltage changing circuit 26 illustrated in FIG. 1. The structures of other components of the alternator 1b will be identical to those of corresponding components of the alternator 1.

Specifically, the regulated voltage changing circuit 26b includes the band-pass filter 261a (see FIG. 3), and a frequency discriminating circuit 262a. The frequency discriminating circuit 262a consists essentially of a first frequency discriminator 262a1 and a second frequency discriminator 262a2.

The regulated voltage changing circuit 26b also includes a first AND circuit 265, a second AND circuit 266, a NOT circuit 267, a first switch element 263a1, a second switch element 263a2, a sixth resistor 264a1 with a resistance r6, and a seventh resistor 264a2 with a resistance r7.

The first frequency discriminator 262a1 has a first output terminal and a second output terminal. The input terminal of the first frequency discriminator 262a1 is connected to an output terminal of the band-pass filter 261a.

The first frequency discriminator 262a1 is operative to compare the frequency of an input signal passing through the band-pass filter 261a with a first predetermined threshold frequency $f_A$ of, for example, 1 MHz.

The second frequency discriminator 262a2 has a first output terminal and a second output terminal. The input terminal of the second frequency discriminator 262a2 is connected to the output terminal of the band-pass filter 261a.

The second frequency discriminator 262a2 is operative to compare the frequency of an input signal passing through the band-pass filter 261a with a second predetermined threshold frequency $f_B$ of, for example, 6 MHz higher than the first threshold frequency $f_A$.

Specifically, if it is discriminated that the frequency of the input signal is lower than the threshold frequency $f_A$, each of the first and second frequency discriminators 262a1 and 262a2 is operative to output, through the output terminal, a signal with a low level.

If it is discriminated that the frequency of the input signal is higher than the fist threshold frequency $f_A$ and lower than the second threshold frequency $f_B$, the second frequency discriminator 262a2 continues to output the low-level signal, whereas the first frequency discriminator 262a1 works to output a signal with a high level-through the output terminal.

If it is discriminated that the frequency of the input signal is higher than the second threshold frequency $f_B$, each of the first and second frequency discriminators 262a1 and 262a2 is operative to output, through the output terminal, the high level signal.

Each of the first and second switch elements 263a1 and 263a2 consists essentially of a transistor, such as an NPN transistor.

The first AND circuit 265 has first and second input terminals and an output terminal. The first input terminal of the first AND it 265 is connected to the output terminal of the first frequency discriminator 262a1, and the second input terminal thereof is connected to an output terminal of the NOT circuit 267.

The output terminal of the first AND circuit 265 is connected to the base of the first switch element 263a1.

The second AND circuit 266 has first and second input terminals and an output terminal. The first input terminal of the second AND circuit 266 is connected to the output terminal of the second frequency discriminator 262a2 and to an input terminal of the NOT circuit 267, and the second input terminal thereof is connected to the first input terminal of the first AND circuit 265.

The output terminal of the second AND circuit 266 is connected to the base of the second switch element 263a2.

The collector of the first switching element 263a1 is connected to the positive input terminal of the comparator 231 through the sixth resistor 264a1, and the emitter thereof is grounded.

Similarly, the collector of the second switching element 263a2 is connected to the negative input terminal of the comparator 231 through the seventh resistor 264a2, and the emitter thereof is grounded.

On the other hand, the external control unit 4a includes a signal output circuit 41a, and third and fourth switch elements 42a1 and 42a2.

Each of the third and fourth switch elements 42a1 and 42a2 consists essentially of a transistor, such as an NPN transistor.

Specifically, the base of the third switch element 42a1 is connected to the ECU 43, and the collector thereof is connected to a first input terminal of the signal output circuit 41a. The emitter of the third switch element 42a1 is grounded.

Similarly, the base of the fourth switch element 42a2 is connected to the ECU 43, and the collector thereof is connected to a second input term of the signal output circuit 41a. The emitter of the fourth switch element 42a2 is grounded.

In the external control Unit 4a according to the third embodiment, when the vehicle is being accelerated, the ECU 43 works to supply, to the base of the third switch element 42a1, a first control signal representing that the vehicle is being accelerated.

In contrast, when the vehicle is being decelerated, the ECU 43 works to supply, to the base of the fourth switch element 42a2, a second control signal representing that the vehicle is being decelerated.

The first control signal input to the base of the third switch element 42a1 permits the third switch element 42a1 to become on. In response to the turning on of the third switch element 42a1, the signal output circuit 41a works to output, to the output terminal B of the alternator 1b, a first command signal CS1 with a first predetermined high frequency $f_{H1}$ on the order of several megahertz or higher. The output first command signal CS1 is superimposed on the voltage at the output terminal B of the alternator 1b. In the third embodiment, the first frequency $f_{H1}$ is set to lie within the band between the first and second cut-off frequencies of the band-pass filter 261a.

On the other hand, the second control signal input to the base of the four switch element 42a2 permits the fourth switch element 42a2 to become on. In response to the turning on of the fourth switch element 42a2, the signal output circuit 41a works to output, to the output terminal B of the alternator 1b, a second command signal CS2 with a second predetermined high frequency $f_{H2}$ on the order of several megahertz or higher, which is higher than the first frequency $f_{H1}$. The second predetermined high frequency $f_{H2}$ is set to lie within the band between the first and second cut-off frequencies of the band-pass filter 261a.

The output second command signal CS2 is superimposed on the voltage at the output terminal B of the alternator 1b.

Next, operations of the alternator control system AS2 for changing the regulated voltage based on the first and second command signals CS1 and CS2 supplied from the external control unit 4a.

While the third switch element 42a1 of the external control unit 4a is in on state based on control of the ECU 43, the signal output circuit 41a outputs the first command signal CS1 to the output terminal B of the alternator 1b to be superimposed on the voltage at the output terminal B. In the third embodiment, as the first command signal CS1, an oscillating signal with the first frequency $f_{H1}$ of 5 MHz and with a peak-to-peak amplitude of 200 mV is used.

As in the case of the first and second embodiments, the first command signal CS1 is sent through the band-pass filter 261a to be input to both the first and second frequency discriminators 262a1 and 262a2.

In the first frequency discriminator 262a1, because the first frequency $f_{H1}$ (5 MHz) of the first command signal CS1 is higher than the first threshold frequency $f_A$ (1 MHz), the high-level signal is output from the first frequency discriminator 262a1 to each of the first and second AND circuits 265 and 266.

In contrast, in the second frequency discriminator 262a2, because the first frequency $f_{H1}$ (5 MHz) of the first command signal CS1 is lower than the second threshold frequency $f_B$ (6 MHz), the low-level signal is output from the second frequency discriminator 262a2 to each of the second AND circuit 266 and the NOT circuit 267.

This allows the high-level signal to be output from the NOT circuit 267 to the first AND circuit 265, so that a high-level signal is output from the first AND circuit 265 to the first switch element 263a1. The high-level signal allows the first switch element 263a1 to be turned on.

On the other hand, because the low-level signal is output from the second frequency discriminator 262a2 to the second switching element 266, the second switching element 263a2 is kept off.

The on state of the first switch element 263a1 allows the second resistor 233 and the sixth resistor 264a1 to be connected in parallel to each other. As a result, the first resistor 232 is connected in series to the parallely connected second and sixth resistors 233 and 264a1.

This allows the voltage at the alternator output terminal B to be divided depending on the ratio of the first resistor 232 and the pair of the parallely connected second and sixth resistors 233 and 264a1. Therefore, a changed reference voltage V1b whose level is smaller than the level of the reference voltage V1 is generated at the tap T1. Specifically, the changed reference voltage V1b is expressed by the following equation;

$$V1b = \frac{\left(\frac{r2 \cdot r6}{r2 + r6}\right) \cdot V_{cc}}{r1 + \left(\frac{r2 \cdot r6}{r2 + r6}\right)} < V1$$

The changed reference voltage V1b is set to be, for example, 12.5 V. The changed reference voltage V1b is applied to the positive terminal of the comparator 231.

Accordingly, like the first embodiment, the field current control operations based on the on/off control of the switch element 24 allow the voltage at the output tea B of the alternator 1b to be regulated to the changed regulated voltage (second regulated voltage) of, for example, 12.5 V lower in level than the first regulated voltage.

On the other hand, while the fourth switch element 42a2 of the external control unit 4a is in on state based on control of the ECU 43, the signal output circuit 41a outputs the second command signal CS2 to the output terminal B of the alternator 1a to be superimposed on the voltage at the output terminal B. In the third embodiment, as the second command signal CS2, an oscillating signal with the second frequency $f_{H2}$ of 7 MHz and with a peak-to-peak amplitude of 200 mV is used.

As in the case of the first and second embodiments, the second command signal CS2 is sent through the band-pass filter 261a to be input to both the first and second frequency discriminators 262a1 and 262a2.

In the first frequency discriminator 262a1, because the second frequency $f_{H2}$ (7 MHz) of the second command signal CS2 is higher than the first threshold frequency $f_A$ (1 MHz), the high-level signal is output from the first frequency discriminator 262a1 to each of the first and second AND circuits 265 and 266.

Similarly, in the second frequency discriminator 262a2, because the second frequency $f_{H2}$ (7 MHz) of the second command signal CS2 is higher than the second threshold frequency $f_B$ (6 MHz), the high-level signal is output from the second frequency discriminator 262a2 to each of the second AND circuit 266 and the NOT circuit 267.

This allows the low-level signal to be output from the NOT circuit 267 to the first AND circuit 265, so that a low-level signal is output from the first AND circuit 265 to the first switch element 263a1. The low-level signal allows the first switch element 263a1 to be turned off.

On the other hand, because the high-level signals output from the respective first and second frequency discriminators 262a1 and 262a2 are input to the second AND circuit 266, a high-level signal is output from the second AND circuit 266 to the second switch element 263a2. The high-level signal allows the second switch element 263a2 to be turned on.

The on state of the second switch element 263a2 allows the fourth resistor 235 and the seventh resistor 264a2 to be connected in parallel to each other. As a result, the third resistor 234 is connected in series to the parallely connected fourth and seventh resistors 235 and 264a2.

This allows the voltage at the alternator output terminal B to be divided depending on the ratio of the third resistor 234 and the pair of the parallely connected fourth and seventh resistors 235 and 264a2. Therefore, a monitor voltage V2b whose level is smaller than the level of the monitor voltage V2 independently of change in the output voltage at the alternator output terminal B is generated to be input to the negative input terminal of the comparator 231.

Specifically, the changed monitor voltage V2b is expressed by the following equation:

$$V2b = \frac{\left(\frac{r4 \cdot r7}{r4+r7}\right) \cdot V_B}{r3 + \left(\frac{r4 \cdot r7}{r4+r7}\right)} < V2$$

Where $V_B$ represents the voltage at the alternator output terminal.

For this reason, when the monitor voltage V2b approximately reaches the reference voltage V1 substantially equivalent to 14V, the regulated voltage at the alternator output tern B according to the third embodiment is higher in level than the regulated voltage at the alternator output terminal B according to the first embodiment. Like the second embodiment, in the third embodiment, the regulated voltage at the alternator output terminal B can be set to, for example, 16 V.

As described above, the alternator 1b (the alternator control system AS2) of the third embodiment has obtained the identical effects of the first and second embodiments.

Especially, in the alternator control system AS2, it is possible to:

reduce the regulated voltage at the alternator output terminal B to suppress the output power of the alternator 1b while the vehicle is being accelerated, thereby reducing the engine load of the vehicle; and increase the regulated voltage at the alternator output terminal B to store regenerative electric power in the battery 3 while the vehicle is being decelerated, thereby reducing the engine load of the vehicle.

In the third embodiment, the first frequency $f_{H1}$ of the first command signal CS1 is set to be higher than the first threshold frequency $f_A$ and lower than the second threshold frequency $f_B$. In addition, the second frequency $f_{H2}$ of the second command signal CS2 is set to be higher than each of the first and second threshold frequencies $f_A$ and $f_B$. The present invention however is not limited to the setting.

Specifically, the second frequency $f_{H2}$ of the second command signal CS2 is set to be higher than the first threshold frequency $f_A$ and lower than the second threshold frequency $f_B$. In addition, the first frequency $f_{H1}$ of the first command signal CS1 is set to be higher than each of the first and second threshold frequencies $f_A$ and $f_B$.

In this modification, it is assumed that the second command signal CS2 is input to each of the first and second frequency discriminators 262a1 and 262a2. Specifically, the second frequency $f_{H2}$ of the second command signal CS2 is higher than the first threshold frequency $f_A$ and lower than the second threshold frequency $f_B$.

In this assumption, the first frequency discriminator 262a1 can output the high-level signal, but the second frequency discriminator 262a2 can output the low-level signal so that, as described above, the regulated voltage at the alternator output terminal B can be set to, for example, 12.5 V lower in level than the first regulated voltage.

Similarly, it is assumed that the first command signal CS1 is input to each of the first and second frequency discriminators 262a1 and 262a2. Specifically, the first frequency $f_{H1}$ of the first command signal CS1 is higher than each of the first threshold frequency $f_A$ and the second threshold frequency $f_B$.

In this assumption, each of the first and second frequency discriminators 262a1 and 262a2 can output the high-level signal so that, as described above, the regulated voltage at the alternator output terminal B can be set to, for example, 16 V higher in level than the first regulated voltage.

In each of the first to third embodiments and their modifications, the alternator control unit 2 is installed in the alternator 1, but a control unit having the same functions as the alternator control unit 2 can be installed in a power-generator having a different type of the alternator 1.

In each of the first to third embodiments and their modifications, the alternator 1 is installed in a vehicle, but the present invention is not limited to the structure. Specifically, the alternator 1 can be configured to be installable in various types of machines.

While there has been described what is at present considered to be the embodiments and modifications of the present invention, it will be understood that various modifications which are not described yet may be made therein, and it is intended to cover in the appended claims all such modifications as fall within the true spirit and scope of the invention.

What is claimed is:

1. A power-generator control apparatus installed in a power-generator designed to generate an output voltage at an output terminal thereof, the power-generator control apparatus comprising:

a regulating unit configured to regulate the output voltage so that the regulated output voltage is substantially equivalent to a first target value; and a regulated voltage changing unit operatively connected to the regulating unit and configured to:

when a periodic signal with a predetermined frequency is applied from outside of the power-generator to the output terminal thereof to be superimposed on the output voltage, receive the periodic signal;

compare the frequency of the received periodic signal with a predetermined threshold frequency; and change the first target value of the regulated output voltage to a second target value upon the frequency of the received periodic signal being higher than the predetermined threshold frequency.

2. A power-generator control apparatus according to claim 1, wherein the regulated voltage changing unit includes a filtering unit having a predetermined cut-off frequency, the frequency of the periodic signal being set to be higher than the predetermined cut-off frequency, the filtering unit allowing the received periodic signal to pass therethrough.

3. A power-generator control apparatus according to claim 2, wherein the regulated voltage changing unit includes a discriminating unit configured to discriminate whether the frequency of the received periodic signal is higher than the predetermined threshold frequency, and the threshold frequency of the discriminating unit is set to be higher than a frequency of an electrically oscillating noise, the electrically oscillating noise being caused by output-voltage generating operations of the power-generator.

4. A power-generator control apparatus according to claim 1, wherein a battery is connected to the output terminal of the power generator, the first target is set to be substantially equivalent to a charging voltage of the battery in normal state, and the second target value is set to be lower than the first target value.

5. A power-generator control apparatus according to claim 1, wherein the regulated voltage changing unit includes a filtering unit having a predetermined passing frequency band, the frequency of the periodic signal being set to lie within the predetermined frequency band.

6. A power-generator control apparatus according to claim 5, wherein the regulated voltage changing unit includes a discriminating unit configured to discriminate whether the frequency of the received periodic signal is higher than the predetermined threshold frequency, and the threshold frequency of the discriminating unit is set to be higher than a frequency of an electrically oscillating noise, the electrically oscillating noise being caused by output-voltage generating operations of the power-generator.

7. A power-generator control apparatus according to claim 6, wherein the filtering unit is configured to cut off signals lying within a predetermined cut-off frequency band higher than the predetermined passing frequency band.

8. A power-generator control apparatus according to claim 7, wherein a battery is connected to the output terminal of the power generator, the first target value is set to be substantially equivalent to a charging voltage of the battery in a normal state, and the second target value is set to be different from the first target value.

9. A power-generator control apparatus according to claim 1, wherein a battery is connected to the output terminal of the power generator, the frequency of the periodic signal is variable, the predetermined threshold frequency includes a first threshold frequency and a second threshold frequency, the first target value is set to be substantially equivalent to a charging voltage of the battery in a normal state, the regulated voltage changing unit includes:
   a first discriminating unit configured to discriminate whether the frequency of the received periodic signal is higher than the first threshold frequency;
   a second discriminating unit configured to discriminate whether the frequency of the received periodic signal is higher than the second threshold frequency;
   a setting unit configured to, when it is discriminated that the frequency of the periodic signal is varied to lie within a range between the first threshold frequency and the second threshold frequency by the first and second discriminating units, set the second target value to a third target value, and to, when it is discriminated that the frequency of the periodic signal is varied to be equal to or higher than the second threshold frequency by the second discriminating unit, set the second target value to a fourth target value, one of the third and fourth target values being lower than the first target value, the other of the third and fourth target values being higher than the first target value.

10. A power-generator control apparatus according to claim 1, wherein the regulating unit includes:
   a comparator having a first input terminal and a second input terminal;
   a first circuit connected to the first input terminal of the comparator and configured to apply a first reference voltage substantially equivalent to the first target value to the first input terminal thereof; and
   a second circuit connected to the output terminal of the power-generator and to the second input terminal of the comparator and configured to apply a first monitor voltage to the second input terminal thereof, the first monitor voltage depending on change in the output voltage at the output terminal, the comparator outputting a compared result between the first reference voltage and the first monitor voltage, and
   wherein the regulated-voltage changing unit is configured to change one of the first reference voltage and the first monitor voltage to corresponding one of a second reference voltage and a second monitor voltage to change the first target value of the regulated output voltage to the second target value, the second reference voltage being set to be lower in level than the first reference voltage, the second monitor voltage being set to be lower in level than the first monitor voltage independently of change in the output voltage at the output terminal of the power-generator.

11. A power-generator control apparatus according to claim 10, wherein the power-generator has a stator with a stator winding, a rotor having a field winding and rotatably disposed relative to the stator, rotation of the rotor magnetizing the stator to thereby induce a voltage in the stator winding even while no current flows through the field winding, further comprising a power source circuit, and a trigger circuit configured to generate a trigger signal based on the induced voltage in the stator winding, the power source circuit working to generate an operating voltage in the power-generator control apparatus, the first circuit being configured to generate the first reference voltage based on the generated operating voltage.

12. A power-generator control system in which a power-generator is designed to generate an output voltage at an output terminal thereof, the power generator control system comprising:
   a regulating unit configured to regulate the output voltage so that the regulated output voltage is substantially equivalent to a first target value;
   a signal applying unit located outside of the power-generator and configured to apply a periodic signal with a predetermined frequency to the output terminal to be superimposed on the output voltage;
   a discriminating unit configured to receive the periodic signal superimposed on the output voltage and to discriminate whether the frequency of the received periodic signal is higher than a predetermined threshold frequency; and
   a regulated voltage changing unit operatively connected to the regulating unit and configured to change the first target value of the regulated output voltage to a second target value when it is discriminated that the frequency of the received periodic signal is higher than the threshold frequency.

13. A power-generator control system according to claim 12, wherein the power-generator control system and the power-generator are installed in a vehicle, the signal applying unit is configured to:
   apply, as the periodic signal, a first signal to the output terminal to be superimposed on the output voltage during acceleration of the vehicle; and
   apply, as the periodic signal, a second signal with a predetermined second frequency to the output terminal to be superimposed on the output voltage during deceleration of the vehicle, one of the first and second frequencies being higher than the other thereof, the discriminating unit is configured to:

receive the periodic signal superimposed on the output voltage;

discriminate whether a frequency of the received periodic signal is within a range between the first threshold frequency and a second threshold frequency, or is higher than each of the first threshold frequency and the second threshold frequency, the second threshold frequency being higher than the first threshold frequency, the regulated voltage changing unit is configured to:

change the first target value of the regulated output voltage to the second target value when it is discriminated that the frequency of the received periodic signal is within the range between the first threshold frequency and the second threshold frequency; and change the first target value of the regulated output voltage to a third target value when it is discriminated that the frequency of the received periodic signal is higher than each of the first threshold frequency and the second threshold frequency.

14. A power-generator control system according to claim 13, wherein if the second frequency is set to be higher than the first frequency, the second target value is set to be lower than the first target value, and the third target value is set to be higher than the first target value, and otherwise if the second frequency is set to be lower than the first frequency, the second target value is set to be higher than the first target value, and the third target value is set to be lower than the first target value.

* * * * *